(12) United States Patent
Haas et al.

(10) Patent No.: US 8,452,752 B2
(45) Date of Patent: May 28, 2013

(54) PRIORITIZING CRAWL LISTS USING SOCIAL NETWORKING RANKINGS

(75) Inventors: Kevin Haas, Los Gatos, CA (US);
Yi-An Lin, Sunnyvale, CA (US);
Shankar Kalyanaraman, San Francisco, CA (US); Sameer Indarapu, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 96 days.

(21) Appl. No.: 13/102,489

(22) Filed: May 6, 2011

(65) Prior Publication Data

US 2012/0284251 A1 Nov. 8, 2012

(51) Int. Cl.
*G06F 7/00* (2006.01)
(52) U.S. Cl.
USPC .......................................... 707/709
(58) Field of Classification Search
USPC ................ 707/705, 706, 709, 710, 748, 749, 707/999.003–999.005
See application file for complete search history.

(56) References Cited

U.S. PATENT DOCUMENTS

| | | |
|---|---|---|
| 2008/0005072 A1 | 1/2008 | Meek et al. |
| 2009/0006388 A1* | 1/2009 | Ives et al. ........................ 707/5 |
| 2009/0012940 A1* | 1/2009 | Ives et al. ........................ 707/3 |
| 2009/0112701 A1* | 4/2009 | Turpin et al. .................... 705/10 |
| 2010/0082593 A1 | 4/2010 | Singh |
| 2010/0114946 A1 | 5/2010 | Kumar et al. |
| 2011/0022602 A1 | 1/2011 | Luo et al. |

OTHER PUBLICATIONS

Zhang, et al., "Exploiting Tags and Social Profiles to Improve Focused Crawling", In Proceedings of the 2009 IEEE/WIC/ACM International Joint Conference on Web Intelligence and Intelligent Agent Technology, vol. 1, Sep. 15-18, 2009, 4 pages.
Zhang, et al., "Profile-Based Focused Crawling for Social Media-Sharing Websites", In Journal on Image and Video Processing, vol. 2009, Jan. 6, 2009, 14 pages.
"Matt Cutts Confirms Social Network Data Affect Ranking Signals", Available at: http://webupon.com/search-engines/matt-cutts-confirms-social-network-data-affect-ran king-signals/#ixzz1GbFWzUnM.
Gou, et al., "Social Network Document Ranking", In Proceedings of the 10th annual joint conference on Digital libraries, 2010, 10 pages.

* cited by examiner

*Primary Examiner* — Hung T Vy
(74) *Attorney, Agent, or Firm* — Shook, Hardy & Bacon L.L.P.

(57) ABSTRACT

Methods, systems, and computer-storage media having computer-usable instructions embodied thereon, for prioritizing crawl lists based on social networking rankings are provided. Various scores are associated with users based on a variety of factors including activity levels with respect to social networking services, activity levels with respect to search engines, and interactions with other users in a social networking environment. The scores are used to compute a ranking for the users and, based on the rankings, a crawl list is prioritized such that content associated with the social networking environment is crawled at an appropriate time.

18 Claims, 4 Drawing Sheets

PRIORITIZING CRAWL LISTS USING SOCIAL NETWORKING RANKINGS

BACKGROUND

It has become increasingly common for users to expect the most relevant, up-to-date information to be provided via the Internet. Typically, users enter a search query and are presented with, what a search engine hopes is, the most relevant information responsive to the user's search query. Many search engines rely on "Web crawlers" to gather Web page data in order to provide the data to users.

A search engine may desire to include social networking content in the data scoured by the Web crawler. The content associated with social networking environments should be, as any other content presented to a user, relevant and recent. To ensure that relevant data is available to a user quickly, crawl lists are utilized to organize content that is to be gathered by the Web crawler such that more relevant information is crawled prior to less relevant information. Content associated with social networking environments is, however, difficult to include in the crawl lists as it is typically not readily available and there is not an established method to rank the social networking content either alone or with respect to a search engine. Search engines, in turn, have difficulty generating prioritized crawl lists that include content associated with social networking environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to systems, methods, and computer storage media for, among other things, prioritizing crawl lists based on social networking rankings. Social networking rankings may be associated with content within a social networking environment such as, for example, user profiles, images, files, videos, or the like. The rankings may be calculated based on, among other things, how active a user is with respect to the social networking environment, how active the user is with respect to a search engine, personal connections within the social networking environment, and the like. The rankings may be used to generate a prioritized crawl list where content associated with a higher ranking is scheduled to be "crawled" prior to content associated with a lower ranking.

BRIEF DESCRIPTION OF THE DRAWINGS

The present invention is described in detail below with reference to the attached drawing figures, wherein.

DETAILED DESCRIPTION

Figure 1:
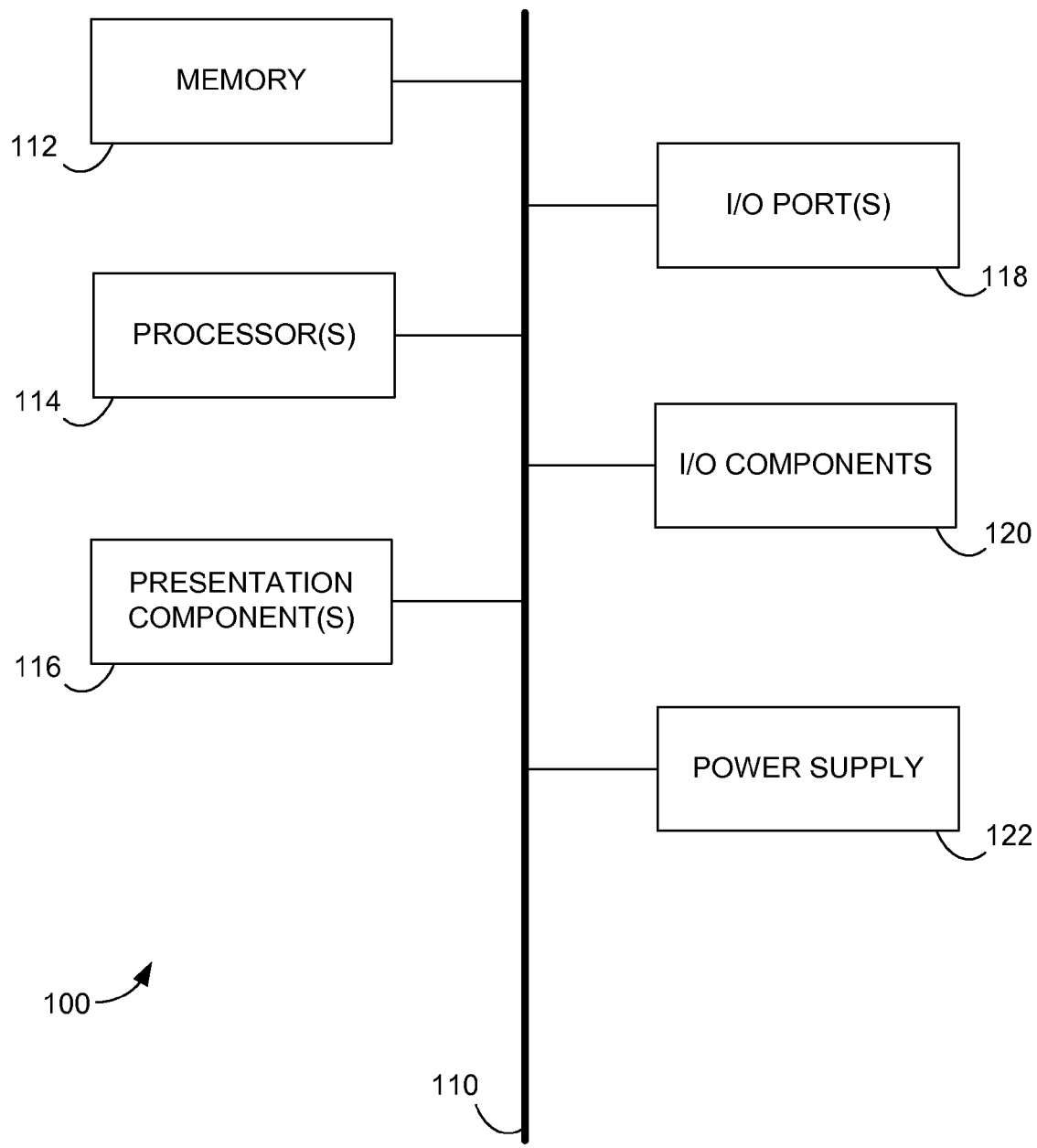
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to systems, methods, and computer storage media for, among other things, prioritizing crawl lists based on social networking rankings. Including social networking content in crawl lists allows a search engine to prioritize content to crawl, including social networking content. Social networking content, as used herein, refers generally to content within a social networking environment such as, for example, user profiles, images, files, videos, or the like.

The rankings may be calculated based on, among other things, how active a user is with respect to the social networking environment, how active the user is with respect to a search engine, personal connections within the social networking environment, and the like. The rankings may be used to generate a prioritized crawl list where content associated with a higher ranking is scheduled to be "crawled" prior to content associated with a lower ranking.

Accordingly, one embodiment of the present invention is directed to one or more computer-storage media storing computer-useable instructions that, when used by one or more computing devices, cause the computing device to perform a method for prioritizing crawl lists based on social networking rankings. The method comprises identifying a plurality of users registered with a social networking service; identifying a first score and a second score for each of the plurality of users; calculating a personal score for each of the plurality of users; calculating a global score using the first score, the second score, and the personal score; and prioritizing a crawl list of the search engine based on the global score.

Another embodiment of the present invention is directed to a system comprising a processor and a memory for prioritizing crawl lists based on social networking rankings. The system comprises a ranking engine that identifies a plurality of users associated with a social networking service, identifies a first and second score for each of the plurality of users, calculates a personal score for each of the plurality of users using social connections within the social networking service, generates a ranking of each of plurality of users, and prioritizes a crawl list for a search engine based on rankings of each of the plurality of users.

Yet another embodiment of the present invention is directed to one or more computer-storage media storing computer-useable instructions that, when used by one or more computing devices, cause the computing device to perform a method for prioritizing crawl lists based on social networking rankings. The method comprises receiving an identification for each of a plurality of users associated with a social networking service; identifying a first score, a second score, and a personal score for each of the plurality of users; calculating a global score for each of the plurality of users; identifying a new user that has registered with the social networking service; identifying one or more users of the plurality of users that is associated with the new user; calculating an estimated score for the new user using the first score and second score of the one or more users associated with the new user; and prioritizing a crawl list of the search engine using the global score for each of the plurality of users and the estimated score for the new user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
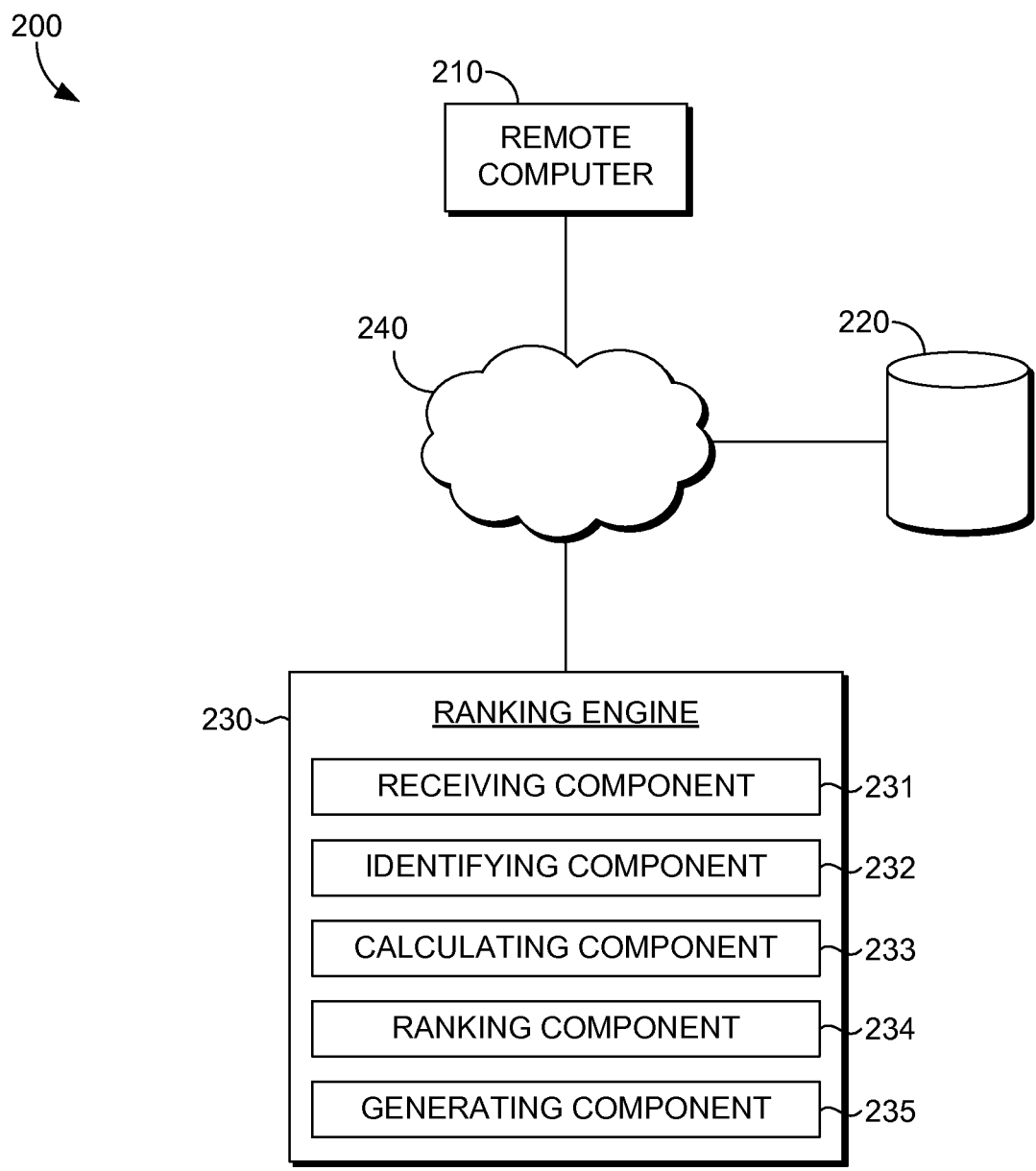
FIG. 2 is a block diagram that illustrates an environment for prioritizing crawl lists based on social networking rankings, in accordance with an embodiment of the present invention.

As indicated previously, embodiments of the present invention are directed to prioritizing crawl lists using social networking rankings. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a remote computer 210, a data repository 220, a ranking engine 230, and a network 240. The remote computing device 210 may include any type of computing device, such as the computing device 100 described with reference to FIG. 1, for example. The ranking engine 230 may take the form of a dedicated device for performing the functions described below, may be integrated into, e.g., the remote computing device 210, a network access device, a search engine, a server, or the like, or any combination thereof. The components of the computing system 200 may communicate with each other via the network 240, which may include, without limitation, one or more local area networks (LANs) and/or wide area networks (WANs). Such networking environments are commonplace in offices, enterprise-wide computer networks, intranets and the Internet. It should be understood that any number of computing devices and ranking engines may be employed in the computing system 200 within the scope of embodiments of the present invention. Each may comprise a single device/interface or multiple devices/interfaces cooperating in a distributed environment. For instance, the ranking engine 230 may comprise multiple devices and/or modules arranged in a distributed environment that collectively provide the functionality of the ranking engine 230 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the ranking engine 230, as an Internet-based service, or as a module inside a search engine. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the ranking engine 230 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which rankings associated with social networking content may be included in prioritized crawl lists. As will be described in further detail below, embodiments of the present invention provide crawl lists to be prioritized in accordance with social networking rankings such that the crawl list content includes social networking content and the most relevant content is crawled prior to less relevant content, thus, presenting the user with the most relevant, up-to-date information.

The ranking engine 230 is configured to rank content associated with social networking environments and, using the rankings, generate a prioritized crawl list including the social networking content. A social networking environment, as used herein, refers generally to any online service that allows one or more users to, via a network, participate in an online forum with one or more additional users. Users of the social networking service may post new messages, respond to posted messages from other users, send private messages, view images or videos, and the like, or any combination thereof. Thus, content associated with the social networking environment, as used herein, refers generally to any information stored in the social networking environment such as, for example, user profiles, information within user profiles, images, videos, messages, links, posts, friend lists, demographic information, and the like.

With continued reference to FIG. 2, the ranking engine 230 includes a receiving component 231, an identifying component 232, a calculating component 233, a ranking component 234, and a generating component 235. Each of the components is configured to enable to the ranking engine 230 to assign rankings to social networking content to prioritize crawl lists.

The receiving component 231 is configured to receive data from, for example, a social networking service. The data received may be social networking content. The data received may be stored, for example, in the data repository 220. In embodiments, an identification of a plurality of users is received from a social networking environment such that the social networking users may be identified.

The receiving component 231 is further configured to receive user inputs from, for example, the remote computing device 210. The user inputs may be search queries, user activities with respect to the social networking service (e.g., posting a message, sending a message privately, etc.), and the like.

The data received by, for example, the receiving component 231 may be identified by the identifying component 232. The identifying component 232 is configured to identify any relevant information from the received data. Relevant information, as used herein, refers generally to content that may be used to generate a ranking. For example, relevant information may include a ranking that is already associated with a user profile, a user identity, activity of the user with respect to the social networking environment, activity of a user with respect to a search engine, commonalities of users, relationships with a social networking environment, and the like.

Activity of a user with respect to both a search engine and a social networking environment may each be associated with ranking scores. Activity of a user with respect to a social networking environment refers generally to a user's activity within the social networking environment. In other words, how much does the user do in the social networking environment? Activity may be based on, for example, a number of messages sent or received by a user, a number of friends of the user, an identity of friends of the user, a number of times the user logs-in to the social networking environment, a number of posts sent or received by the user, and the like. In embodiments, a higher ranking is associated with a user having high activity with respect to the social networking environment rather than a user having low activity with respect to the social networking environment.

Activity of a user with respect to a search engine is similar to that of the social networking environment. For instance, activity of a user with respect to a search engine may be based on a number of search queries input into the search engine, a number of times the user logs-in to the search engine, or the like. In embodiments, a higher ranking is associated with a user having high activity with respect to the search engine rather than a user having low activity with respect to the search engine.

The identifying component 232 may be further configured to identify personal information related to a user of a social networking environment. For instance, a friend list of a user may be identified and rankings associated with each of the "friends" on the friend list may be identified. Further, rankings associated with each "friend of a friend" may be identified. By way of example only, assume that User A has User B and User C on their friend list. A ranking associated with both User B and User C may be identified. Further, a ranking associated with each user included in a friend list of both User B and User C may further be identified and so on.

The calculating component 233 is configured to, using the relevant information, calculate a ranking. The ranking may be associated with social networking content. The calculating component 233 may calculate rankings for both new users and existing users. While existing users may be already be associated with a ranking, as identified by the identifying component 232, social networking content is constantly in flux so the rankings are continuously being adjusted to maintain accurate ranking.

Users may be associated with several rankings, each weighted differently as desired, to calculate a global ranking. A global ranking, as used herein, refers generally to an overall ranking of content. The global ranking may include a first score representing the activity level of a person with respect to a social networking environment, a second score representing the activity of the person with respect to a search engine, a personal score, and the like. As will be described in further detail below, the global score may be calculated for both existing users of social networking environments and new users of social networking environments.

The first score representing the activity level of a person with respect to a social networking environment may be calculated, as previously described, using a user's activity within the social networking environment such as a number of messages sent or received by a user, a number of friends of the user, an identity of friends of the user, a number of times the user logs-in to the social networking environment, a number of posts sent or received by the user, and the like. The first score may also include demographic and/or profile information of the user. For example, the calculating component 233 may be configured to weight scores based on demographics such that a user from a specific country is given a higher ranking than others. By way of further example, the calculating component 233 may be further configured to weight scores based on careers, locations, interests, or the like.

The second score representing the activity of the person with respect to a search engine may be calculated, as previously described, using a user's activity within a search engine such as a number of search queries input into the search engine, a number of times the user logs-in to the search engine, or the like. The second score may also be weighted in any manner desired. For instance, using the search engine for searching (e.g., inputting search queries) may be weighted more than simply having an account with the search engine.

Each of the first score and the separate score may be used to calculate a first static score. A static score, as used herein, refers generally to a ranking of a user before including a personal score. Thus, a static score does not include personal scores. This may be useful for users that do not have personal scores yet, such as new users that have recently registered with the social networking environment. This may also be useful for variations of the rankings since different administrators may weight scores differently. In other words, a personal score may not be that important to some administrators such that a static score is more relevant for a specific ranking purpose. In an embodiment, the first static score is used to calculate an estimated static score for a new user that has recently registered with the social networking environment, as will be further described in detail below.

The calculating component 233 is further configured to calculate a personal score for users. A personal score, as used herein, refers generally to a score (or ranking) that is based on personal relationships of a user within the social networking environment. The personal score, in other words, evaluates the interactions of a user within the social networking environment. Data that is used to compute a personal score may include, for example, identities of a user's friends, a level of interaction with each of the user's friends (e.g., how many times do two users message one another, how many times do two users post to one another, common profile data between users (e.g., users may attend the same school or live in the same city), and the like.

Rankings may be associated with registered users using static scores, personal scores, and the like, or a combination thereof. Registered users, as used herein, refers generally to a user that has been registered with the social networking service for a predetermined period of time. By being registered for a predetermined period of time, a registered user should have sufficient information to compute both static scores and personal scores. Should a registered user not have sufficient information, they may be treated as a new user, as will be discussed in detail below.

Initially, a first score may be identified or calculated for the registered user. The first score, as previously explained, may represent, among other things, activity of the user with respect to the social networking environment. A second score may then be identified or calculated for the user. The second score, as previously explained, may represent, among other things, activity of the user with respect to the search engine. The first and second scores may then be summed together to compute a first static score, or activity score, for the user. As activity levels are constantly changing, the first static score may be recalculated frequently such that it reflects the most recent data.

A personal score may then be identified or calculated for the registered user. A personal score, as previously discussed, may represent, among other things, relationships of users within the social networking environment. The personal score not only includes interactions of the user, it also includes information associated with those users that are party to the interaction. For example, not only is a user evaluated based on how many messages he/she sends to another user, but the user may also be evaluated based on the rankings associated with the user he/she is interacting with.

Once the first score, second score, and personal score are calculated or identified for the registered user, a global score may be calculated or identified. For purposes of explanation, assume that User A has a first static score of twenty (20) and a personal score of one-half (½). Also assume that a friend of User A, User B, is associated with a ranking of ten (10). For this example, the global score would be calculated as follows:

$$\text{Global Score} = \text{First Static Score} + (\text{Personal Score} * \text{Friend's Ranking})$$

In other words, the actual calculation for the above example would be:

$$\text{Global Score} = 20 + (½ * 10)$$

The global score for the registered user in this example would be twenty-five (25). Clearly, a user that is associated with users having low rankings will be given a lower global score than a user associated with users having higher rankings.

Going further, a secondary level may be calculated by including a ranking of a friend of the friend. Using the above example, the second level is calculated by including rankings of one or more friends of User B. An embodiment of the invention utilizes two levels such that a "friend of a friend" is the maximum level to calculate. However, several levels may be included to calculate the global score.

Rankings may also be associated with new users. New users, as used herein, refer generally to users that have recently registered with the social networking environment.

In other words, new users are users that do not have sufficient information to calculate a personal score or a static score. Thus, new users may initially be ranked according to rankings of their friends. In an embodiment, a first static score associated with a friend of the new user may be associated with the new user. If the new user is associated with two or more friends, an average of the first static score's associated with each of the new user's friends may be associated with the new user.

Continuing with the above example, assume that User C is a new user and is associated with User A. Recall that User A had a first static score of twenty (20). Given that User C is a brand new user, they do not yet have an activity level with respect to the social networking environment so their ranking may be estimated using first static scores of associated users. In this case, User C may be associated with a ranking of twenty (20).

Alternatively, new users may be associated with an estimated static score that is an average static score of all users associated with the new user. Thus, if User A and User B, from the above example, were both associated with the new user, User C, then User C may be associated with an estimated static score of fifteen (15) (i.e., the average of twenty (20) and ten (10)).

Once the calculating component 233 has calculated the rankings, the ranking component 234 is configured to prioritize content to crawl using the calculated rankings or scores. The crawl list may be prioritized such that content associated with higher rankings or scores is crawled before content associated with lower rankings. The ranking component 234 may be configured to base the rankings on static scores, personal scores, and the like, or a combination thereof.

The generating component 235 is configured to generate a prioritized crawl list according to the rankings of content. The generating component 235 may utilize the rankings of, for example, the ranking component 234. The prioritized crawl list may be stored in, for example, the data repository 220. Utilizing this prioritized crawl list, a Web crawler pulls in data associated with the content of the crawl list in the order designates by the crawl list such that the more relevant data is available sooner than the less relevant data and is provided to a user that much quicker.

In application, in the embodiment illustrated in FIG. 2, a list of social networking environment users is received identifying one or more users of one or more social networking environments. If any scores are associated with any of the users, the scores are identified. If one or more users do not have a score associated therewith, relevant data may be identified to use in calculating a ranking for the users without a score. Alternatively, relevant data may be identified for all of the users in order to continuously update the rankings of users.

Once the scores are either identified or calculated, the users are ranked according to their scores. This ranking is the order of a crawl list that is generated based on the rankings. Once the crawl list is generated, a Web crawler scours the Web in the order indicated in the crawl list. A user may then be presented with the most relevant and up-to-date content responsive to their search query. Specifically, users may be presented with the most relevant and up-to-date content that includes content associated with social networking environments.

In other embodiments, a search query input by a user may prompt the ranking engine 230 to receive information related to the user, including a social network ranking, if any.

Figure 3:
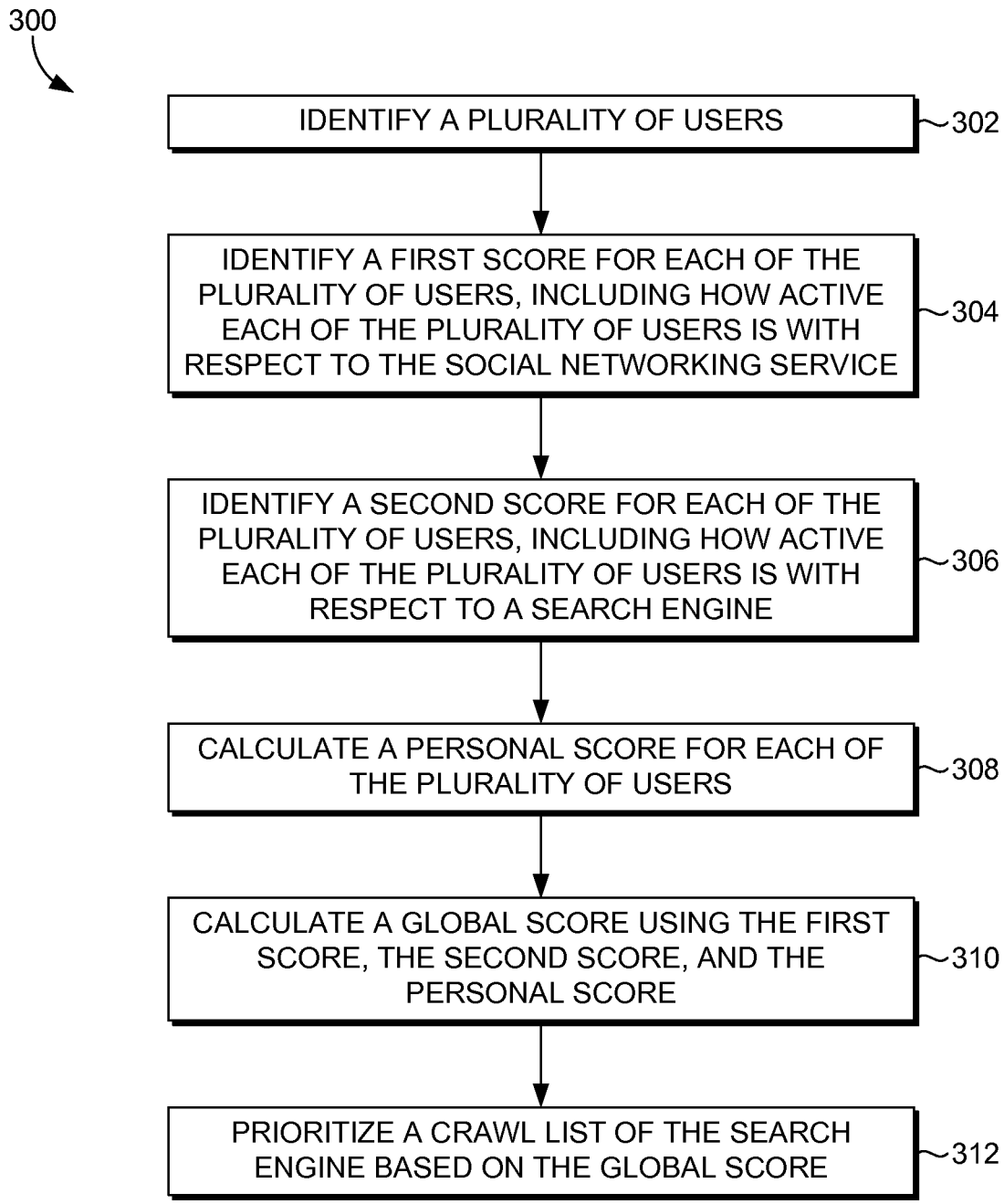
FIG. 3 is a flow diagram showing a method for prioritizing crawl lists based on social networking rankings, in accordance with an embodiment of the present invention.

Referring now to FIG. 3, a flow diagram is provided that illustrates an overall method 300 for prioritizing crawl lists based on social networking rankings, in accordance with an embodiment of the present invention. Initially, as shown at block 302, a plurality of users is identified that is registered with a social networking environment. In other embodiments, the plurality of users may include registered or existing users, new users, and the like, or a combination thereof and the users may be users of a social networking environment, a search engine, and the like, or a combination thereof. At block 304, a first score for each of the plurality of users is identified. The first score represents at least how active each of the plurality of users is with respect to the social networking service. The first score may also represent demographic information. At block 306, a second score is identified for each of the plurality of users. The second score represents at least how active each of the plurality of users is with respect to a search engine. A personal score is calculated for each of the plurality of users at block 308. The personal score represents a level of interaction between two or more users. A global score is calculated at block 310 using the first score, the second score, and the personal score. At block 312, a crawl list is prioritized based on the global score.

Figure 4:
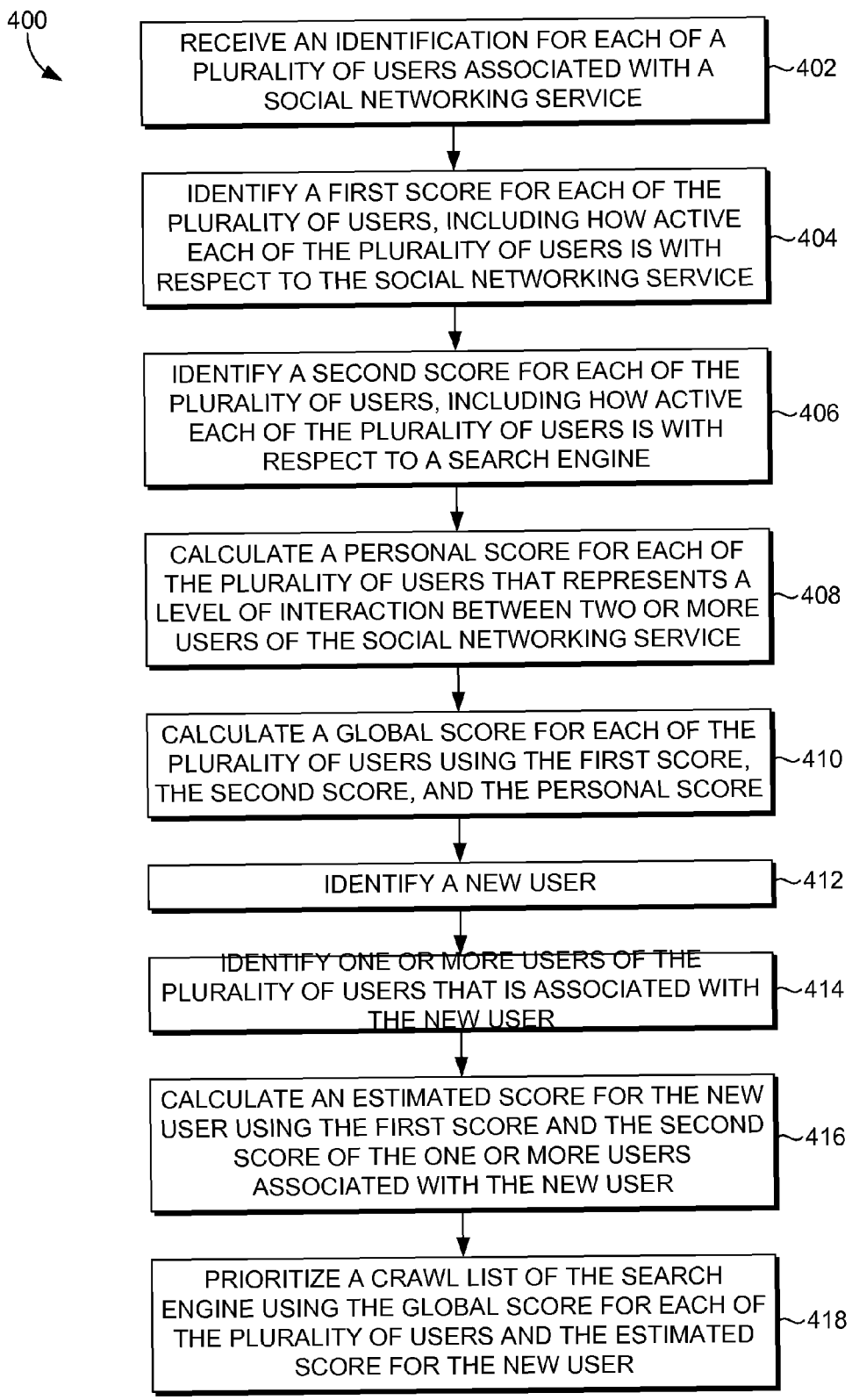
FIG. 4 is a flow diagram showing a method for prioritizing crawl lists based on social networking rankings, in accordance with an embodiment of the present invention.

With reference to FIG. 4, a flow diagram is provided that illustrates a method 400 for prioritizing crawl lists based on social networking rankings, in accordance with an embodiment of the present invention. As shown at block 402, an identification for each of a plurality of users associated with a social networking service is received. The plurality of users may include registered or existing users, new users, and the like, or a combination thereof. A first score is identified for each of the plurality of users at block 404. The first score represents at least how active each of the plurality of users is with respect to the social networking service. A second score is identified for each of the plurality of users at block 406. The second score represents at least how active each of the plurality of users is with respect to a search engine.

A personal score is calculated for each of the plurality of users at block 408. The personal score represents a level of interaction between two or more users of the social networking service. A global score is then calculated at block 410 for each of the plurality of users using the first score, the second score, and the personal score.

A new user that has registered with the social networking service is identified at block 412. One or more users of the plurality of users that is associated with the new user is identified at block 414. An estimated score for the new user is calculated at block 416 using the first score and the second score of the one or more users associated with the new user. At block 418, a crawl list is prioritized for the search engine using the global score for each of the plurality of users and the estimated score for the new user.

As can be understood, embodiments of the present invention provide systems, methods, and computer-storage media having computer-usable instructions embodied thereon, for prioritizing crawl lists based on social networking rankings. Embodiments of the invention may provide social networking rankings for news users and existing users of the social networking service.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media devices storing computer-useable instructions that, when used by the one or more computer storage media devices, cause the one or more computer storage media devices to perform a method, the method comprising:
identifying a plurality of users, wherein each of the plurality of users is registered with a social networking service;
identifying a first score for each of the plurality of users, wherein the first score includes at least how active each of the plurality of users is with respect to the social networking service;
identifying a second score for each of the plurality of users, wherein the second score includes at least how active each of the plurality of users is with respect to a search engine;
calculating a personal score for each of the plurality of users, wherein the personal score represents a level of interaction between two or more users;
calculating a global score using the first score, the second score, and the personal score;
prioritizing a crawl list of the search engine based on the global score;
calculating a first static score by summing the first score and the second score;
identifying a new user that has registered with the social networking service;
identifying one or more of the plurality of users that is associated with the new user; and
calculating an estimated static score for the new user by associating the new user with the first static score of the one or more users associated with the new user.

2. The one or more computer storage media of claim 1, wherein activity with respect to the social networking service is based on at least one of a number of times a user logs into the social networking service, a number of posts by a user in the social networking service, and a number of comments by a user in the social networking service.

3. The one or more computer storage media of claim 1, wherein the first score further includes demographic information for the plurality of users.

4. The one or more computer storage media of claim 1, wherein the method further comprises:
receiving updated score information for the new user, wherein the updated score information represents how active the new user is with one of the social networking service or a search engine; and
calculating an updated static score for the new user using the updated score information for the new user.

5. The one or more computer storage media of claim 1, wherein the method further comprises prioritizing the crawl list of a search engine using the estimated static score of the new user to determine when content associated with the new user will be crawled.

6. The one or more computer storage media of claim 1, wherein prioritizing the crawl list of the search engine comprises indicating that content associated with high global scores is crawled prior to content associated with low global scores.

7. A ranking system for prioritizing crawl lists, comprising:
a computing device associated with one or more processors and one or more computer-readable storage media;
a data store coupled with the computing device; and
a ranking engine that:
identifies a plurality of users associated with a social networking service,
identifies a first score for each of the plurality of users, wherein the first score includes at least how active each of the plurality of users is with respect to the social networking service,
identifies a second score for each of the plurality of users, wherein the second score includes at least how active each of the plurality of users is with respect to a search engine,
calculates a personal score for each of the plurality of users using social connections within the social networking service of each of the plurality of users,
calculates a first static score by summing the first score and the second score,
identifies a new user that has registered with the social networking service,
identifies one or more of the plurality of users that is associated with the new user,
calculates an estimated static score for the new user by associating the new user with the first static score of the one or more users associated with the new user,
generates a ranking of each of the plurality of users, and
prioritizes a crawl list of the search engine based on the rankings of each of the plurality of users.

8. The ranking system of claim 7, wherein the ranking for each of the plurality of users is used to determine a priority of a crawl list for the search engine.

9. The ranking system of claim 7, wherein prioritizing the crawl list includes prioritizing content associated with the plurality of users for the search engine such that content associated with higher rankings is crawled prior to content associated with lower rankings.

10. The ranking system of claim 7, wherein the ranking engine further identifies new users of the social networking service.

11. The ranking system of claim 10, wherein the ranking engine further associates the news users with a ranking based on the ranking of each of the plurality of users.

12. The ranking system of claim 7, wherein the first score further includes demographic information.

13. One or more computer storage media devices storing computer-useable instructions that, when used by the one or more computer storage media devices, cause the one or more computer storage media devices to perform a method, the method comprising:
receiving an identification for each of a plurality of users associated with a social networking service;
identifying a first score for each of the plurality of users, wherein the first score represents at least how active each of the plurality of users is with respect to the social networking service;
identifying a second score for each of the plurality of users, wherein the second score represents at least how active each of the plurality of users is with respect to a search engine;
calculating a personal score for each of the plurality of users, wherein the personal score represents a level of interaction between two or more users of the social networking service;
calculating a global score for each of the plurality of users using the first score, the second score, and the personal score;
identifying a new user that has registered with the social networking service;

identifying one or more users of the plurality of users that is associated with the new user;

calculating an estimated score for the new user using the first score and the second score of the one or more users associated with the new user; and prioritizing a crawl list of the search engine using the global score for each of the plurality of users and the estimated score for the new user.

14. The one or more computer storage media of claim 13, further comprising calculating a first static score for each of the plurality of users by summing the first score and the second score for each of the plurality of users.

15. The one or more computer storage media of claim 13, wherein calculating an estimated score for the new user includes summing the first score and the second score of each of the one or more users associated with the new user to calculate a first static score for each of the one or more users associated with the new user and associating the first static score with the new user.

16. The one or more computer storage media of claim 13, wherein prioritizing the crawl list includes prioritizing content associated with each of the plurality of users and the new user for the search engine such that content associated with higher rankings is crawled prior to content associated with lower rankings.

17. The one or more computer storage media of claim 13, further comprising receiving updated information for the new user and updating the estimated score of the new user based on the updated information.

18. The one or more computer storage media of claim 13, wherein activity with respect to the social networking service is based on at least one of a number of times a user logs into the social networking service, a number of posts by a user in the social networking service, and a number of comments by a user in the social networking service.

* * * * *

UNITED STATES PATENT AND TRADEMARK OFFICE
CERTIFICATE OF CORRECTION

PATENT NO.       : 8,452,752 B2
APPLICATION NO.  : 13/102489
DATED            : May 28, 2013
INVENTOR(S)      : Haas et al.

Page 1 of 1

It is certified that error appears in the above-identified patent and that said Letters Patent is hereby corrected as shown below:

In the Claims

Column 12, line 40, in Claim 11, delete "news users" and insert -- new users --, therefor.

Signed and Sealed this
Third Day of February, 2015

Michelle K. Lee
*Deputy Director of the United States Patent and Trademark Office*